US011453473B2

(12) United States Patent
Van Bavel et al.

(10) Patent No.: US 11,453,473 B2
(45) Date of Patent: Sep. 27, 2022

(54) AIRCRAFT FUSELAGE (71) Applicants: Luc Van Bavel, Quebec (CA); Michael Derman, Bend, OR (US)

(72) Inventors: Luc Van Bavel, Quebec (CA); Michael Derman, Bend, OR (US)

(*) Notice: Subject to any disclaimer, the term of this patent is extended or adjusted under 35 U.S.C. 154(b) by 115 days.

(21) Appl. No.: 16/988,706

(22) Filed: Aug. 9, 2020

(65) Prior Publication Data

US 2021/0039765 A1 Feb. 11, 2021

Related U.S. Application Data

(60) Provisional application No. 62/885,112, filed on Aug. 9, 2019.

(51) Int. Cl.
*B64C 1/06* (2006.01)
*B64C 1/00* (2006.01)

(52) U.S. Cl.
CPC ...... *B64C 1/068* (2013.01); *B64C 2001/0045* (2013.01)

(58) Field of Classification Search
CPC .............. B64C 2001/0045; B64C 1/068
See application file for complete search history.

(56) References Cited

U.S. PATENT DOCUMENTS

| 2,043,980 | A | * | 6/1936 | Bellanca | ............ B64C 1/08 244/119 |
| 6,834,833 | B2 | | 12/2004 | Sankrithi | |
| 8,757,545 | B2 | | 6/2014 | Lesemann | |
| 2009/0294588 | A1 | * | 12/2009 | Griess | .............. B64C 1/18 244/121 |
| 2018/0194548 | A1 | * | 7/2018 | Helou, Jr. | .............. B60P 3/00 |
| 2020/0216175 | A1 | | 7/2020 | de Melo | |

FOREIGN PATENT DOCUMENTS

| EP | 2840023 A1 * | 2/2015 | ............ B64C 1/00 |
| WO | WO2008040868 A1 | 4/2008 | |

OTHER PUBLICATIONS

Incodocs, "Unit Load Devices (ULD) Air Container Specs", original publication date unknown.
Trimble, Steven, "Analysis: Will Boeing's next aircraft be an oval or a circle?", published Sep. 2015 at internet address https://www.flightglobal.com/analysis-will-boeings-next-aircraft-be-an-oval-or-a-circle/118367.article.
Tegler, E., "With Its New SkyCourier Textron Will Try to Top One of the Most Successful Aircraft Ever", Apr. 2021, published at internet address: https://www.forbes.com/sites/erictegler/2021/04/16/with-its-new-skycourier-textron-aviation-will-try-to-top-one-of-the-most-successful-cargo-aircraft-ever/?sh=6c71c6d2a029.
Avic Haig, "Y12F Aircraft Technical Data", published Mar. 2016.

* cited by examiner

*Primary Examiner* — Timothy D Collins
*Assistant Examiner* — Justin Michael Heston
(74) *Attorney, Agent, or Firm* — Phillip M. Wagner (57) ABSTRACT

An aircraft fuselage includes a stretched-quadrant fuselage segment having from to four stretched-quadrant fuselage projections spaced at intervals around the fuselage. The stretched-quadrant fuselage segment enables an aircraft to be configured for three-across seating rows and for carrying an LD-3 unit load device inside the fuselage with the seats removed.

11 Claims, 5 Drawing Sheets

AIRCRAFT FUSELAGE

CROSS REFERENCE TO RELATED APPLICATIONS

This application claims the benefit of U.S. Provisional Patent Application No. 62/885,112 filed Aug. 9, 2019 and incorporated herein by reference in its entirety.

FIELD OF THE INVENTION

Embodiments relate generally to aircraft for commuter and/or regional flights and more particularly to short-haul aircraft provided with alternative fuselage lengths, sometimes referred to as "stretched" versions, configurable without substantial structural modifications of the fuselage for carrying passengers and/or unit load devices above the cabin floor inside the fuselage.

BACKGROUND

Aircraft manufacturers have responded to market demand for short-haul aircraft with aircraft designs that can be manufactured with fuselage lengths selected to accommodate passenger capacities from about 19 seats to about 100 seats. Short-haul aircraft, which may be most cost effective for flights less than about three hours duration, are designed to provide savings in operating costs, maintenance costs, and cost of ground support facilities compared to larger aircraft capable of longer flight range, greater cargo capacity, and/or larger passenger numbers per flight. Short-haul aircraft may be used for commuting between nearby cities, transporting passengers between regional airports and hub airports, and transporting air freight to and from regional airports. Examples of aircraft available in stretched and unstretched versions include Beechcraft King Air models 90, 200, 300, and 1900, Saab 340 and Saab 2000, and de Havilland Dash 8-100 (37 passengers), Dash-8 200, Dash-8 300 and Dash 8-400 (over 80 passengers). Other examples of short-haul aircraft include the ATR 42 (48 passengers) and 72 (75 passengers), Embraer 135, 140, and 145, and the Bombardier CRJ series with a 50-seat version and stretched versions up to 104 seats.

Some aircraft designs may be provided in alternative versions having different fuselage lengths. An aircraft modified by elongating the fuselage to accommodate more passengers or more freight may be referred to as a "stretched" version of the aircraft. Civilian short-haul aircraft used by commercial air carriers arrange seating in rows of 2, 3, or 4 seats, although exit rows and other locations may have fewer seats per row than other parts of a passenger cabin. For example, 19-seat aircraft arrange seats in rows of two or three seats across in most seating rows. Aircraft with 25 to 50 seats may use 3-across seating in most seating rows. Aircraft with 37 to 104 seats may use four-across seating in most seating rows. For commercial short-haul aircraft in current use, four-across seating is not used below fuselages with 37-seat capacity because the fuselage length would be too short relative to wingspan compared to stretched versions of the same series, leading to flight stability problems and negating the advantage of a wing with design and manufacturing features common to all members of a series. Aircraft configured for two-across seating have not previously been stretched beyond 19 seats (up to 10 rows with at least one row having a single seat) at commonly used seat spacings because the fuselage elongation needed for more than 19 seats requires longer landing gear to prevent the tail of the aircraft striking the runway during take-off.

Some short-haul aircraft are configured for carrying freight or may be modified to carry freight by removing passenger seats from the passenger cabin. A removable part of an aircraft referred to as a "unit load device" (ULD) provides for safe and secure freight stowage aboard an aircraft, efficient freight handling during aircraft loading and unloading, multiple sources of supply for ULDs and equipment for moving ULDs, protection of items being transported, and at least some protection of the aircraft and people from items being transported. A ULD may be separated from an aircraft, moved to a freight terminal for loading and unloading, and returned to the same aircraft or taken to another aircraft. ULDs are provided in standardized shapes and sizes to facilitate compatibility with different aircraft types and support equipment such as conveyors, carts, and lifting devices. ULD descriptions and specifications may be found, for example, in publications of the International Air Transport Association (IATA). Examples of ULDs include pallets, pallets with nets, box-like enclosures with fabric sides, enclosures with rigid sides and doors, and enclosures with support equipment such as refrigeration units. An example of a ULD in common use aboard aircraft may be referred to as an "LD-3" ULD.

LD-3 ULDs were developed for stowage side-by-side in rows in a cargo compartment under the passenger cabin of a widebody aircraft but have entered into use aboard other aircraft types. For example, although not originally designed for LD-3 transport, ATR models were found to be adaptable for carrying LD-3 containers by removing the 4-across passenger seating and stowing the containers in the pressurized cabin with the longest container dimension parallel to the longitudinal centerline of the fuselage, rather than perpendicular to the longitudinal centerline as when stowing LD-3 containers in widebody aircraft. Stowing LD-3 containers with the longest dimension parallel to the longitudinal centerline of the fuselage leaves a substantial volume of space unused around the containers between the straight sides of the containers and the curved interior surface of the fuselage wall. The fuselage wall, sometimes referred to as the "skin" of the fuselage, is an essential structural component of the aircraft fuselage, and is preferably not subjected to contact with ULDs during loading, unloading, and flight operations. Space between the fuselage and ULDs may be unusable for carrying freight aboard an aircraft, raising the transport cost per unit weight or unit volume of air freight.

Modifying the design of an aircraft fuselage, for example by applying a scale factor to the cross-sectional dimensions of a fuselage too small to carry an LD-3, may result in a larger fuselage capable of carrying an LD-3, but will also give a heavier and less-aerodynamic structure due to the increase in surface area and associated drag. Larger engines may be needed, further increasing operating expense. Furthermore, such modifications may require expensive and time-consuming certification of the redesigned fuselage. As a result, there are presently no commercial short-haul aircraft available that can carry LD-3 containers and support 3-across seating in stretched configurations from 19 to 60 seats.

SUMMARY

An example of an embodiment of a fuselage for an aircraft includes a flight deck segment and a stretched-quadrant fuselage segment joined to the flight deck segment. The stretched-quadrant fuselage segment includes a first end and a second end opposite the first end; a central longitudinal axis extending from the first end to the second end; and a fuselage wall enclosing a central void from the first end to the second end.

The fuselage wall includes an interior surface adjacent the central void; a selected separation distance between the interior surface and an inscribed circle centered on the central longitudinal axis and tangent to the interior surface at a first tangent point, a second tangent point vertically opposite the first tangent point, a third tangent point separated by an angle of about ninety degrees from the first tangent point, and a fourth tangent point transversely opposite the third tangent point. The fuselage wall further includes the interior surface displaced from the inscribed circle by the selected separation distance at a first stretched quadrant positioned between the first tangent point and the fourth tangent point, a second stretched quadrant positioned between the first tangent point and the third tangent point, a third stretched quadrant positioned between the second tangent point and the third tangent point, and a fourth stretched quadrant positioned between the second tangent point and the fourth tangent point.

A position of each of the first stretched quadrant protrusion, the second stretched quadrant protrusion, the third stretched quadrant protrusion, and the fourth stretched quadrant protrusion corresponds to: a vertical axis passing through the central longitudinal axis, the first tangent point at an intersection between the vertical axis and the interior surface near the top of the fuselage, and the second tangent point at an intersection between the vertical axis and the interior surface near the bottom of the fuselage; a transverse horizontal axis forming an intersection with the central longitudinal axis and the vertical axis, the third tangent point at an intersection between the transverse horizontal axis and the interior surface near a port side of the fuselage, and the fourth tangent point at an intersection between the transverse horizontal axis and the interior surface near a starboard side of the fuselage; and the center of the inscribed circle positioned at the intersection of the transverse horizontal axis, the central longitudinal axis, and the vertical axis.

The fuselage for an aircraft optionally includes a second stretched-quadrant fuselage segment joined at its first end to the second end of the stretched-quadrant fuselage segment; and a tail segment joined to the second end of the second stretched-quadrant fuselage segment.

In an alternative embodiment, the stretched-quadrant fuselage segment is provided separately from other parts of an aircraft fuselage.

BRIEF DESCRIPTION OF THE DRAWINGS

FIG. 4 shows an end view of an example stretched-quadrant fuselage segment. The viewing direction is from the front toward the back, showing an example of forward-facing passenger seats arranged in 3-across seating rows. FIG. 4 applies to stations B, C, and D in the example figures for aircraft embodiments configured with passenger seating.

DESCRIPTION

An example apparatus embodiment includes an aircraft fuselage incorporating at least one stretched-quadrant fuselage segment. A stretched-quadrant fuselage segment is formed from a fuselage wall shaped with a stretched-quadrant protrusion at two and optionally four locations around the wall. When the stretched-quadrant fuselage segment is formed with the preferred range of dimensions for interior height between the bottom of the fuselage and the top of the fuselage and the preferred range of dimensions for the interior transverse horizontal width between the port and starboard sides of the fuselage, the stretched-quadrant protrusions enable the aircraft fuselage to be selectively configured for three-across passenger seating and for carrying LD-3 unit load devices.

The stretched-quadrant fuselage segment may be manufactured with alternative length dimensions to provide different numbers of seating rows in stretched models of an aircraft fuselage, without substantial modification to the flight deck segment, the tail segment, and the stretched-quadrant fuselage segment to which the wings are attached. In contrast to previously known aircraft providing four-across seating in versions sufficiently large to accept an LD-3 container, the disclosed aircraft fuselage embodiments provide greater strength, lower exterior surface area resulting in lower aerodynamic drag, and lower operating cost. Furthermore, in contrast to previously known short-haul aircraft, the disclosed stretched-quadrant fuselage segment embodiments can be joined end-to-end to provide cost-effective and aerodynamically stable short-haul aircraft with LD-3 load-carrying capacity in aircraft configurations from 19-seat versions to 58-seat versions with three-across seating in most rows.

Figure 1:
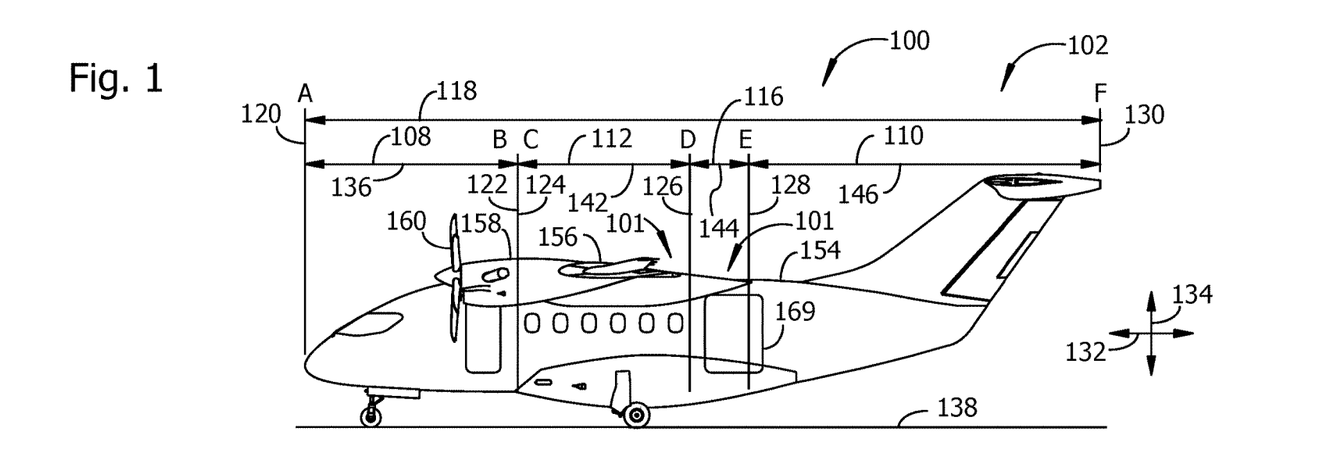
FIG. 1 shows a side view of an example aircraft embodiment having a flight deck segment, a first stretched-quadrant fuselage segment adjacent the wings, a second stretched-quadrant fuselage segment immediately aft the first stretched-quadrant fuselage segment, and a tail segment immediately aft the second stretched-quadrant fuselage segment.

FIG. 1 illustrates a view toward a side of an outer surface 154 of an example embodiment of an aircraft fuselage 100 forming part of a short-haul aircraft 102 capable of carrying 19 passenger seats with most rows using three-across seating. A vertical arrow 134 and a horizontal arrow 132 show examples of reference directions used herein, with the horizontal direction parallel to a horizontal surface 138 such as a runway or taxiway and the arrow 132 further representing examples of opposing longitudinal directions for the aircraft. The vertical direction 134 is perpendicular to the horizontal surface 138. The example aircraft fuselage 100 in FIG. 1 includes two stretched-quadrant fuselage segments 101, a first stretched-quadrant fuselage segment 112 and a second stretched-quadrant fuselage segment 116 joined to, or alternatively formed as an integral part of, the first stretched-quadrant fuselage segment 112. The wings 156 are structurally attached near the top 150 of the first stretched-quadrant fuselage segments 112 in the example aircraft (102, 104, 106) illustrated herein, although other arrangements are possible. An engine nacelle 158 attached to the wing 156 carries a propulsion engine for turning a propeller 160, although an engine without a propeller may alternatively be used. Optional windows 168 may be formed in the fuselage 100, for example in the stretched-quadrant fuselage segment 101 and elsewhere. A flight deck segment 108 is joined to the first stretched-quadrant fuselage segment in the example of FIG. 1. A tail segment 110 is joined to the aft end of the second stretched-quadrant fuselage segment 116. The fuselage 100 includes a door 169 large enough to admit an LD-3 ULD. The door 169 may be have a location and size that differs from the example in the figure. In some embodiments of an aircraft fuselage 100, the flight deck segment 108, stretched-quadrant fuselage segment 101, and tail segment 110 may be manufactured by different vendors and brought together to form a complete aircraft fuselage 100. Alternatively, any combination of two or more fuselage segments including the flight deck segment, stretched-quadrant fuselage segments, and/or tail segment may be manufactured and assembled at one location and may alternatively be manufactured as one integral assembly.

Figure 2:
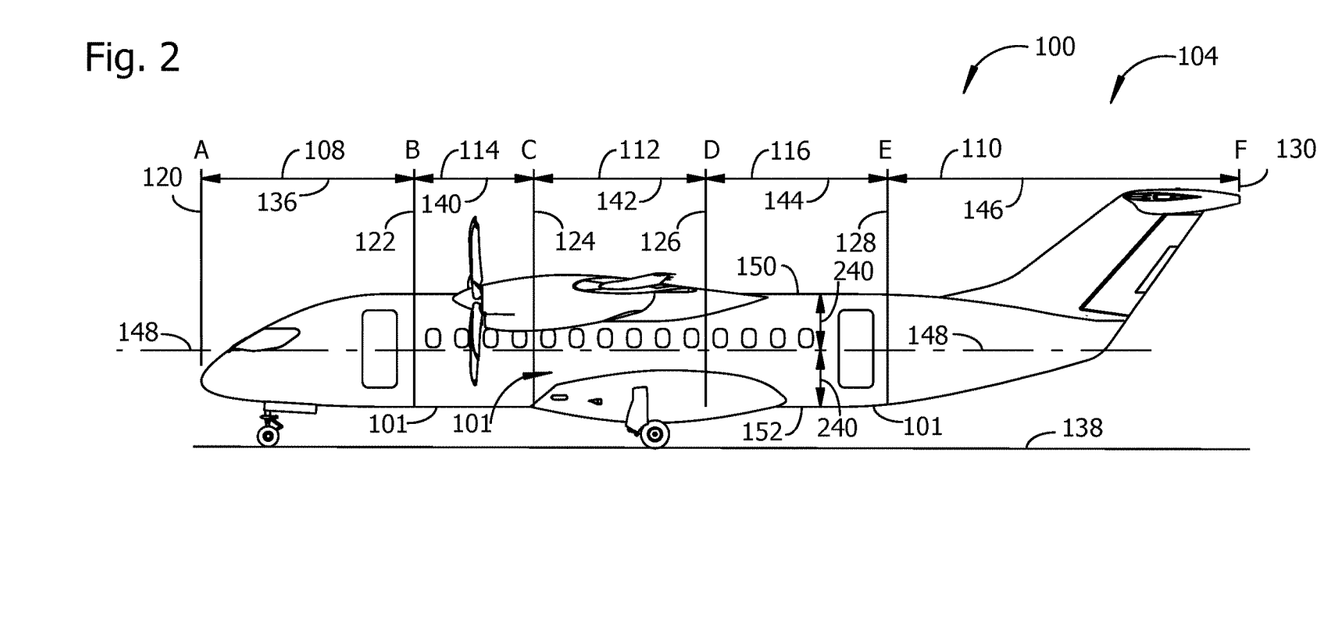
FIG. 2 shows a side view of an alternative example aircraft embodiment having the flight deck segment, first stretched-quadrant fuselage segment, and tail segment as in FIG. 1, an elongated second stretched-quadrant fuselage segment compared to the example of FIG. 1, and adding a third stretched-quadrant fuselage segment immediately forward of the first stretched-quadrant fuselage segment and aft of the flight deck segment.

FIG. 2 illustrates a view toward a side view of an example embodiment of an aircraft fuselage 100 forming part of a short-haul aircraft 104 capable of carrying 36 passenger seats with most rows using three-across seating. The example aircraft fuselage 100 in FIG. 2 includes a third stretched-quadrant fuselage segment 114 interposed between the flight deck segment 108 and the first stretched-quadrant fuselage segment 112. The third stretched-quadrant fuselage segment 114 is not included in the example aircraft 102 of FIG. 1. The second stretched-quadrant fuselage segment 116 in FIG. 2 is substantially longer than the corresponding fuselage segment in the example of FIG. 1, as summarized in Table 1. The example aircraft 104 in FIG. 2 represents a stretched version of the example aircraft 102 in FIG. 1.

FIG. 2 further illustrates an example of a longitudinal centerline 148 passing through the fuselage 100 halfway between the top 150 and bottom 152 of the stretched-quadrant fuselage segments 101. The longitudinal centerline 148 contributes to discussion to follow of the preferred positions of the stretched-quadrant protrusions.

Figure 3:
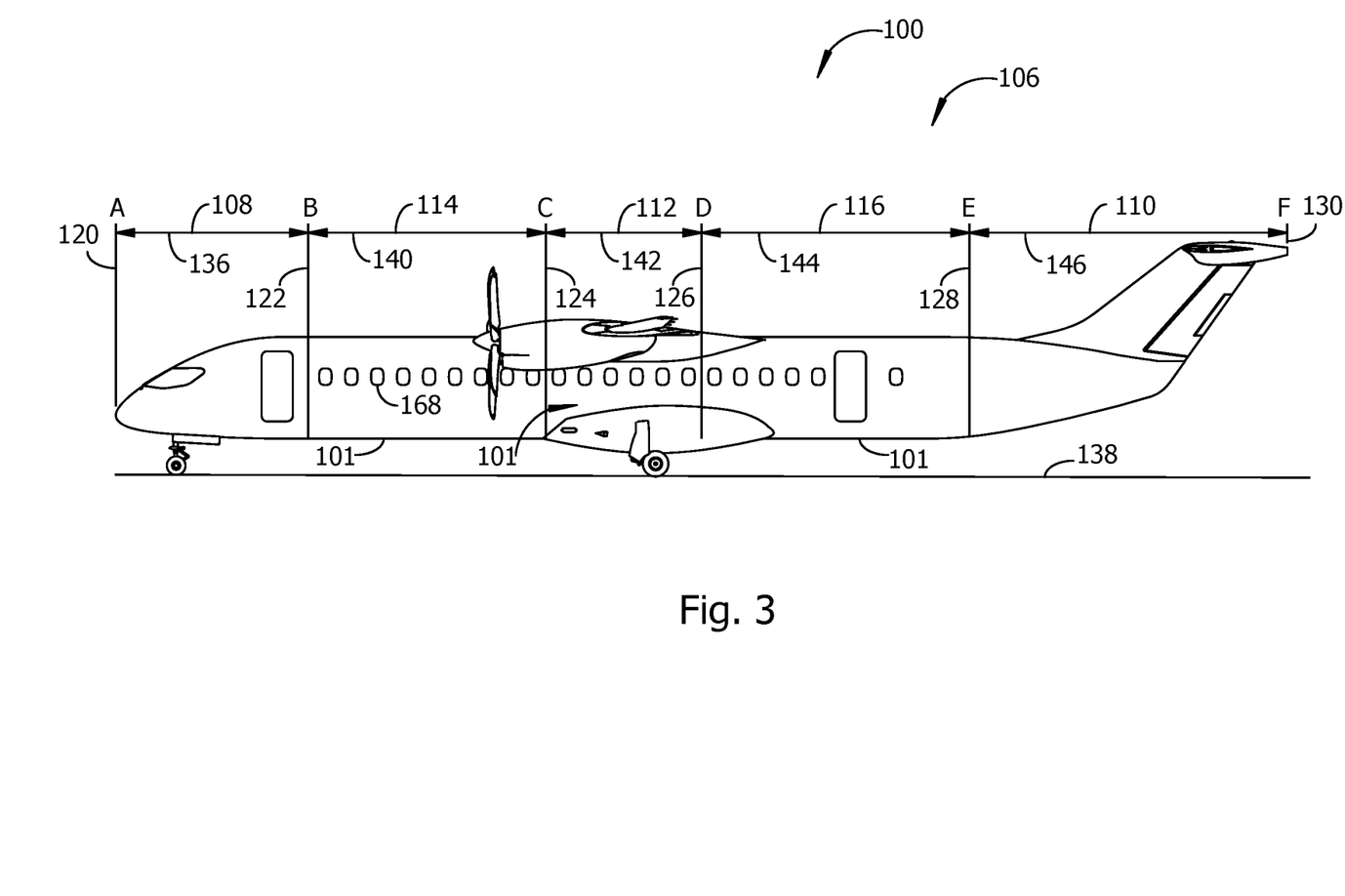
FIG. 3 shows a side view of another alternative example aircraft embodiment having the first stretched-quadrant fuselage segment as in FIG. 1 and FIG. 2, but with the second and third stretched-quadrant fuselage segments elongated compared to the example of FIG. 2.

FIG. 3 illustrates a view toward a side view of an example embodiment of an aircraft fuselage 100 forming part of a short-haul aircraft 106 capable of carrying 50 passenger seats with most rows using three-across seating. The third stretched-quadrant fuselage segment 114, not present in the aircraft example 102 of FIG. 1, is substantially longer than the corresponding fuselage segment in the example of FIG. 2. The example aircraft 106 in FIG. 3 represents another stretched version of the example aircraft 102 in FIG. 1 and the example aircraft 104 in FIG. 2.

FIGS. 1-3 are marked with station positions A 120, B 122, C 124, D 126, E 128, and F 130 to illustrate examples of dimensions and other features for alternative aircraft configurations (102, 104, 106). Station A 120 is at the extreme front end of the aircraft. Station F 130 is at the extreme aft end of the aircraft. An overall length 118 of each aircraft corresponds to a dimension from station A 120 to station F 130. Station B 122 is at the aft end of the flight deck segment 108, and in aircraft (104, 106) with an optional third stretched-quadrant fuselage segment 114, at the forward end of the third stretched-quadrant fuselage segment 114. Station C 124 is at the forward end of the first stretched-quadrant fuselage segment 112 and, in aircraft (104, 106) with the optional third stretched-quadrant fuselage segment 114, at the aft end of the third segment 114. The aircraft 102 in the example of FIG. 1 omits the optional third stretched-quadrant fuselage segment 114 and therefore shows station B 122 and station C 124 superimposed on one another. Station D 126 is at the aft end of the first stretched-quadrant fuselage segment 112 and at the forward end of the second stretched-quadrant fuselage segment 116. Station E 128 is at the aft end of the second stretched-quadrant fuselage segment 116 and the forward end of the tail segment 110.

Figure 4:
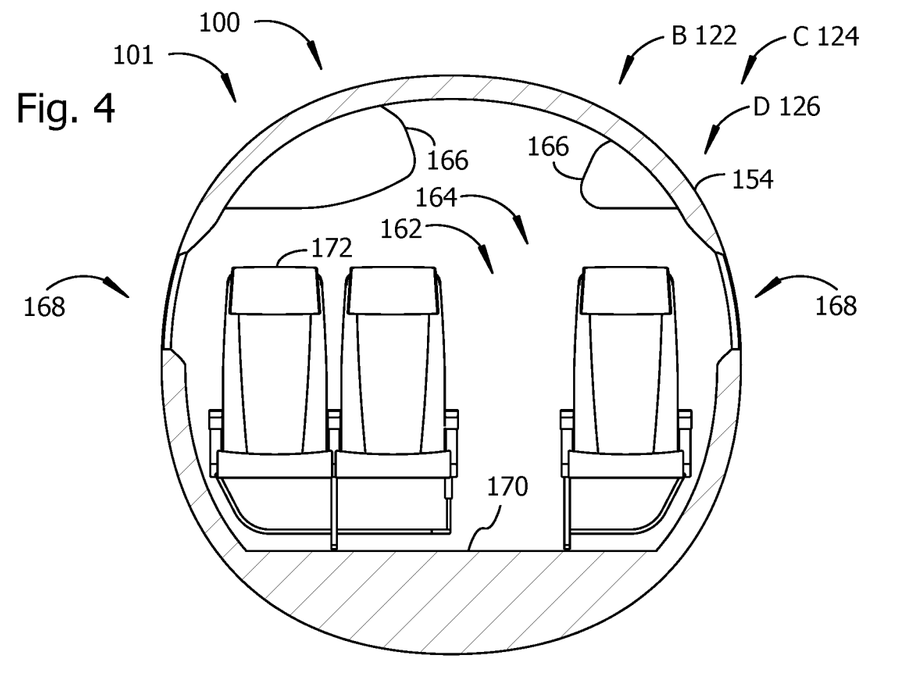
Figure 5:
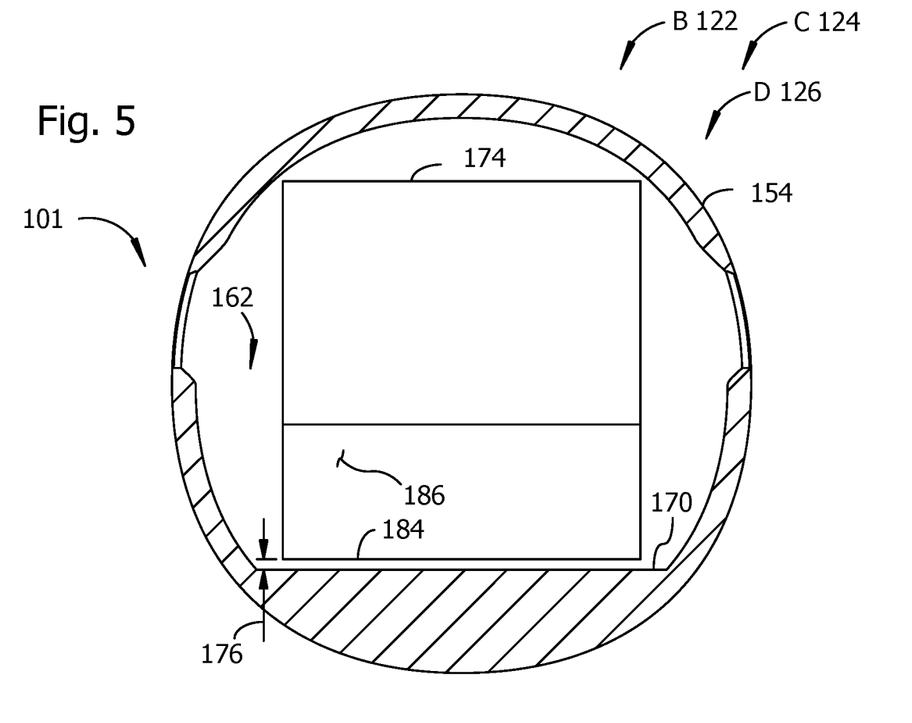
FIG. 5 shows an example alternative view of the stretched-quadrant fuselage segment of FIG. 4, with the passenger seats removed and an LD-3 ULD positioned inside the fuselage.

FIG. 4 shows an example stretched-quadrant fuselage segment 101 in a view toward the front end of the segment. Example passenger seats 172 are removably attached to a passenger floor 170 in a row in an example of three-across seating 164 inside the cabin 162. The cabin 162 occupies a portion of a void space enclosed by the fuselage walls and above a cabin floor 170. Example overhead luggage bins 166 are removably attached near the top of the fuselage. FIG. 4 is representative of views at stations B 122, C 124, and D 126 in FIGS. 1-3. FIG. 5 shows an alternative configuration of the same stretched-fuselage segment 101 of FIG. 4, in which the seats 172 and overhead bins 166 have been removed and an example of an LD-3 ULD 174 is positioned inside the stretched-quadrant fuselage segment 101 above the cabin floor 170, the LD-3 preferably not in contact with the fuselage wall as shown in the figure. In the examples of 4 and 5, ductwork, hydraulic lines, electrical fixtures, connections, wiring, antennas, and other aircraft equipment which may be carried in the spaces marked by hatching are omitted. In the example of FIG. 5, a bottom side 184 of the LD-3 ULD 174 is shown elevated above the cabin floor 170 by an example vertical separation distance 176. The vertical separation distance 176 provides room for conveyor rollers, wheels, skids, or other means (not illustrated in the figure) of loading, unloading, and/or securing the LD-3 ULD. A preferred value for the vertical separation distance 176 is in a range from about 2 inches (5 centimeters) to about 3 inches (8 centimeters).

Figure 6:
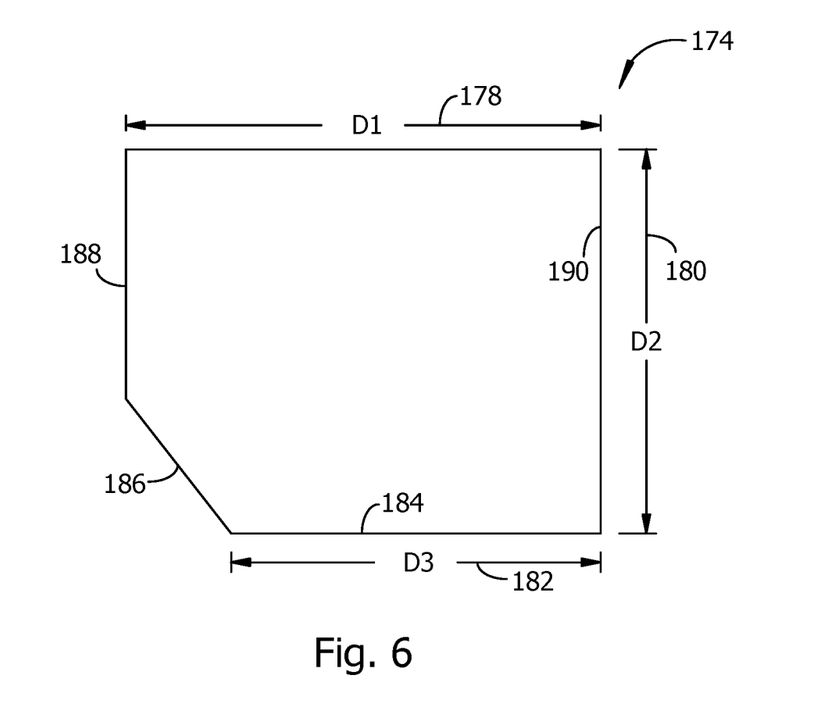
FIG. 6 shows a view toward a straight side of an example LD-3 ULD suitable for use with the disclosed stretched-quadrant fuselage embodiments.
Figure 7:
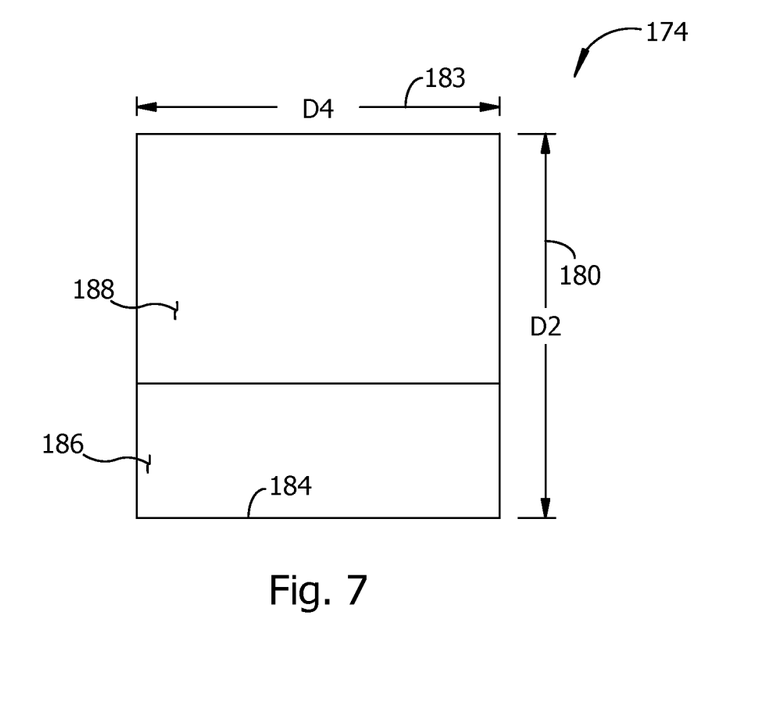
FIG. 7 shows a view toward a side with an angled face of the example LD-3 ULD of FIG. 6.

FIGS. 6 and 7 show example outer dimensions of an LD-3 ULD container 174, for example a longest dimension of the LD-3 D1 178 along a top side of the LD-3, another dimension D3 182 along the bottom side 184 parallel to D1 178, an overall vertical height dimension D2 180. The LD-3 may have a long vertical face 190 along a first side of the LD-3 and a second, shorter vertical face 188 along an opposite side. An angled panel 186 attached to the bottom side and the short vertical side 188 is provided on LD-3 containers to allow the containers to be stowed close to the curved side wall of the fuselage for a widebody aircraft. For the disclosed aircraft examples (102, 104, 106), the LD-3 ULDs are loaded into the stretched-quadrant segments of the fuselage with the angled panel 186 facing forward or alternatively aft, thus rotating the LD-3 90 degrees from the stowed position commonly used on widebody aircraft. Approximate example values for D1 178, D2 180, D3 182, and D4 183 include D1=79 inches (201 centimeters), D2=64 inches (163 centimeters), D3=61.5 inches (156 centimeters), and D4=60.4 inches (153 centimeters).

Figure 8:
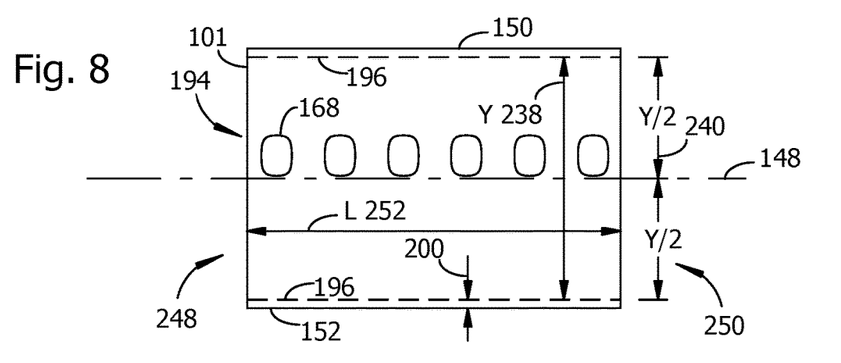
FIG. 8 shows a side view of an example stretched-quadrant fuselage segment.
Figure 9:
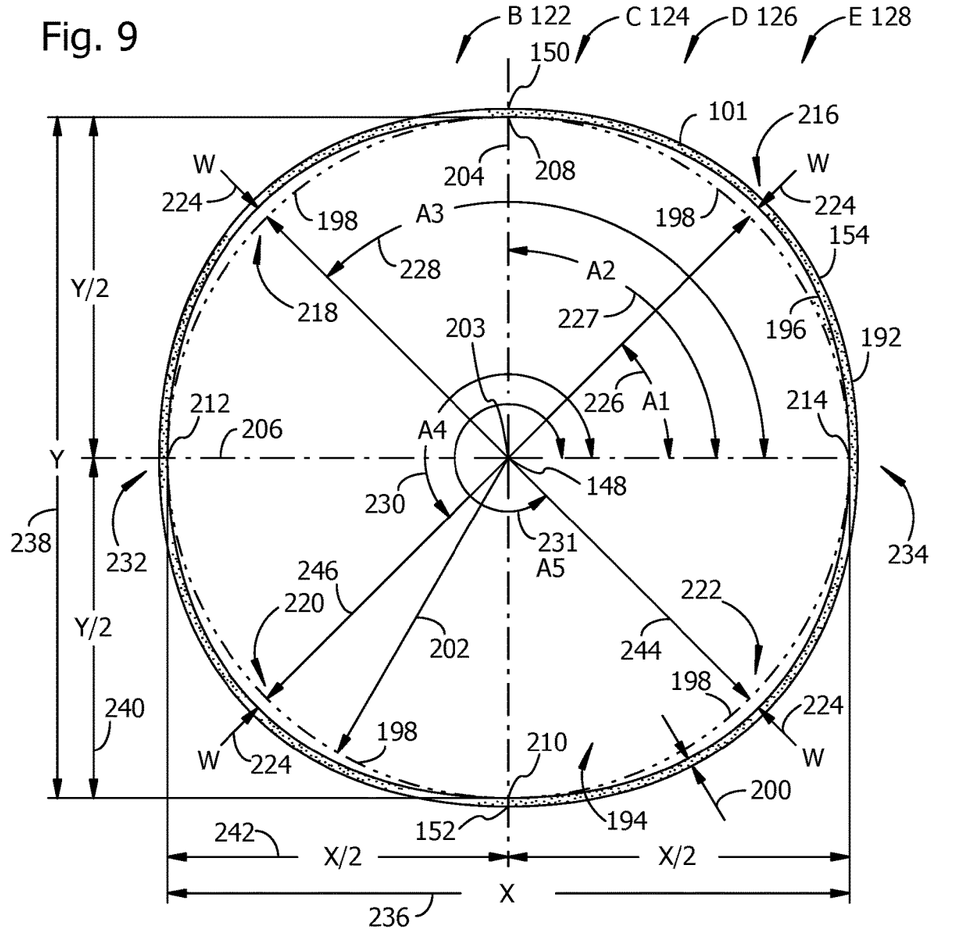
FIG. 9 shows some details of a stretched-quadrant fuselage segment in a view toward the aft end of the stretched-quadrant fuselage segment.

FIGS. 8 and 9 illustrate examples of dimensions and angles for specifying preferred locations of the stretched-quadrant protrusions (216, 218, 220, 222). The fuselage wall 192 encloses a void space 194 from a forward end 248 to an aft end 250. Example values of a length L 252 for alternative embodiments of a stretched-quadrant fuselage segment 101 are shown in Table 1, with the alternative lengths L corresponding to the separation distances of related stations shown in FIGS. 1-3. A stretched-quadrant fuselage section 101 in accord with the disclosed embodiments preferably has an interior height dimension Y 238 measured along a vertical axis 204 intersecting the longitudinal centerline 148 and a transverse horizontal axis 206 intersecting the vertical axis 204 and the longitudinal centerline 148. The thickness 200 of the fuselage wall 192 corresponds to the separation distance between the interior surface 196 and the outer surface 154. The common intersection point between the longitudinal centerline 148, the vertical axis 204, and the transverse horizontal axis 206 forms a center 203 for an inscribed circle 198 tangent at more than three and fewer than five tangent points on the interior surface 196 of the fuselage wall 192, including a first tangent point 208 at the intersection of the vertical axis 204 and the interior surface 196 near the top 150 of the fuselage and a second tangent point 210 at the intersection of the vertical axis 204 and the interior surface 196 near the bottom 152 of the fuselage. A third tangent point 212 is positioned at an intersection between the transverse horizontal axis 206 and the interior surface 196 near the port side 232 of the fuselage and a fourth tangent point 214 is positioned at an intersection between the transverse horizontal axis 206 and the interior surface 196 near the starboard side 234 of the fuselage. The inscribed circle 198 preferably neither intersects nor is tangent to the inner surface 196 of the fuselage wall at points other than the four preferred tangent points (208, 210, 212, 214), although the inscribed circle may intersect ductwork, wiring, fixtures, longerons, ribs, and so on attached to the inner surface.

The preferred interior height dimension Y 238 corresponds to the vertical separation distance between the first tangent point 208 and the second tangent point 210. The preferred transverse horizontal width X 236 corresponds to the separation distance between the third tangent point 212 and the fourth tangent point 214. The radius 202 of the inscribed circle is equal to half the interior vertical dimension Y/2 240, and is further equal to half the interior transverse horizontal dimension X/2 242. Relative to the interior surface 196 near the port side 232 and bottom 152 of the fuselage, the center 203 of the inscribed circle 198 is therefore also positioned at X/2 242, Y/2 240.

Each of the four stretched-quadrant protrusions shown in the example of FIG. 9 have the inner surface 196 displaced away from the inscribed circle 198 by a selected maximum separation distance W 224. For the disclosed embodiments of a stretched-quadrant fuselage segment 101, a preferred value for the maximum separation distance W 224 is in a range from 1 inch (2.5 centimeters) to 4 inches (10.2 centimeters). The position of the maximum separation distance W 224 for each stretched quadrant protrusion is marked by an angle in the example of FIG. 9. The first stretched-quadrant protrusion 216 is positioned on the fuselage wall with the maximum separation distance W 224 at an angle A1 226 of 45 degrees. The vertical axis 204 is at an angle A2 227 of 90 degrees to the transverse horizontal axis 206. The second stretched-quadrant protrusion 218 is positioned on the fuselage wall with the maximum separation distance W 224 at an angle A3 228 of 135 degrees. The third stretched-quadrant protrusion 220 is positioned on the fuselage wall with the maximum separation distance W 224 at an angle A4 229 of 225 degrees. The fourth stretched-quadrant protrusion 222 is positioned on the fuselage wall with the maximum separation distance W 224 at an angle A5 230 of 315 degrees. Angles A1 226, A2 227, A3 228, A4 229, and A5 230 are measured counterclockwise along the interior surface 196, starting from the fourth tangent point 214 and with the vertex of the measured angle at the center 203 of the inscribed circle 198.

In the example of FIG. 9, the first stretched-quadrant protrusion 216 is at an opposite end of a diagonal 246 of the inscribed circle 198 from the third stretched-quadrant protrusion 220. The second stretched-quadrant protrusion 218 is at an opposite end of a diagonal 244 of the inscribed circle 198 from the fourth stretched-quadrant protrusion 222.

An alternative embodiment of a stretched-quadrant fuselage section 101 has fewer than four stretched-quadrant protrusions, for example just the first 216 and second 218 stretched-quadrant protrusions or alternatively just the third 220 and fourth 222 stretched-quadrant protrusions.

Table 1 lists examples of preferred linear and angular dimensions for the disclosed embodiments.

TABLE 1

Example dimensions for embodiments of an aircraft fuselage 100 with 3-across seating and LD-3 ULD load-carrying capability

| Description | Dimension range in inches (centimeters) by aircraft seating capacity | | |
|---|---|---|---|
| | 19-seat ref. no. 102 | 36-seat ref. no. 104 | 50-seat ref. no. 106 |
| longitudinal dimension 136, station A 120 to station B 122 (flight deck segment 108) | 180 to 220 (457 to 559) | 180 to 220 (457 to 559) | 180 to 220 (457 to 559) |
| longitudinal dimension 140, station B 122 to station C 124 (third stretched-quadrant fuselage segment 114) | 0 | 100 to 120 (254 to 305) | 200 to 250 (508 to 635) |
| longitudinal dimension 142, station C 124 to station D 126 (first stretched-quadrant fuselage segment 112) | 130 to 180 (330 to 457) | 130 to 180 (330 to 457) | 130 to 180 (330 to 457) |
| longitudinal dimension 144, station D 126 to station E 128 (second stretched-quadrant fuselage segment 116) | 40 to 60 (102 to 152) | 140 to 190 (356 to 483) | 240 to 290 (610 to 737) |
| longitudinal dimension 146, station E 128 to station F 130 (tail segment 110) | 280 to 330 (711 to 838) | 280 to 330 (711 to 838) | 280 to 330 (711 to 838) |
| interior transverse width X 236 | 92 to 104 (234 to 264) | 92 to 104 (234 to 264) | 92 to 104 (234 to 264) |
| interior height Y 238 | 92 to 104 (234 to 264) | 92 to 104 (234 to 264) | 92 to 104 (234 to 264) |

As shown in the example dimensions of Table 1, the longitudinal dimension 136 of the flight deck segment 108, station A 120 to station B 122, have the same range of values in common for all three aircraft fuselage 100 examples (102, 104, 106). The longitudinal dimension 142 of the first stretched-quadrant fuselage segment 112, station C 124 to station D 126, has a same range of values for all three aircraft fuselage 100 examples. The longitudinal dimension 146 of the tail segment 110, station E 128 to station F 130, has another range of values that are the same for all three aircraft fuselage 100 examples. The interior transverse width X 236 and the interior height Y 238 have yet another range of values in common for all embodiments 100 using the 5 disclosed stretched-quadrant fuselage segment 101.

Stretched-quadrant fuselage segments may be manufactured as individual parts and assembled into a completed aircraft fuselage. Two or more stretched-quadrant fuselage segments from the examples is FIG. 1 may alternatively be fabricated as a single integrated fuselage segment, with the length ranges of the individual segments combined to form the corresponding length range for the integrated fuselage segment.

Linear dimensions expressed in Table 1 and elsewhere herein are preferably accurate to +/−1.0 inch (+/−2.5 centimeter) in some embodiments and to +/−0.10 inch (+/−0.25 centimeter) in other embodiments, although tighter tolerances may be used. Angular dimensions expressed herein are preferably accurate to +/−5 degrees in some embodiments and to +/−1 degree in other embodiments, although tighter tolerances may be used.

Unless expressly stated otherwise herein, ordinary terms have their corresponding ordinary meanings within the respective contexts of their presentations, and ordinary terms of art have their corresponding regular meanings.

What is claimed is:

1. A fuselage for an aircraft, comprising:
   a flight deck segment;
   a first of a stretched-quadrant fuselage segment joined to said flight deck segment, said stretched-quadrant fuselage segment comprising:
   a fuselage wall extending longitudinally from a first end to a second end of said stretched-quadrant fuselage segment, said fuselage wall enclosing a void space configurable as a cabin having a cabin floor, said cabin configured to accept a seating row including up to three passenger seats attached to said cabin floor and further configured to accept above said cabin floor an LD-3 unit load device having an overall height dimension of 64 inches (163 centimeters), a longest dimension of 79 inches (201 centimeters), and a third dimension across opposing sides of 60.4 inches (153 centimeters), said LD-3 unit load device positionable with an angled panel on said LD-3 unit load device extending in a transverse direction across said stretched-quadrant fuselage segment;
   said fuselage wall having an interior surface formed with an interior transverse width in a range from 92 inches (234 centimeters) to 104 inches (264 centimeters) and an interior height in a range from 92 inches to 104 inches, said interior surface having a longitudinal centerline positioned halfway along said interior transverse width and halfway along said interior height;
   said fuselage wall formed with a first of a stretched-quadrant protrusion, said stretched-quadrant protrusion formed by a displacement of said interior surface away from an inscribed circle centered on said longitudinal centerline, said inscribed circle tangent to said interior surface at opposite ends of a transverse horizontal axis passing through said longitudinal centerline;
   said displacement having a maximum separation distance from said inscribed circle to said interior surface in a range from one inch (2.5 centimeters) to four inches (10.2 centimeters);
   said first stretched-quadrant protrusion formed above said transverse horizontal axis with said maximum separation distance located along said interior surface at an angle of 45 degrees from said transverse horizontal axis; and
   a second of said stretched-quadrant protrusion formed above said transverse horizontal axis with said maximum separation distance located along said interior surface at an angle of 135 degrees from said transverse horizontal axis;
   a second of said stretched-quadrant fuselage segment joined to said first stretched-quadrant fuselage segment; and
   a tail segment joined to said second stretched-quadrant fuselage segment.

2. The fuselage for an aircraft of claim 1, wherein said first stretched-quadrant fuselage segment and said second stretched-quadrant fuselage segment are formed integrally with one another.

3. The fuselage for an aircraft of claim 1, wherein a length of said first stretched-quadrant fuselage segment is in a range from 100 inches (254 centimeters) to 120 inches (305 centimeters).

4. The fuselage for an aircraft of claim 1, wherein a length of said second stretched-quadrant segment is in a range from 40 inches (102 centimeters) to 290 inches (737 centimeters).

5. The fuselage for an aircraft of claim 1, wherein a length of said flight deck segment is in a range from 180 inches (457 centimeters) to 220 inches (559 centimeters).

6. The fuselage for an aircraft of claim 1, wherein a length of said tail segment is in a range from 280 inches (711 centimeters) to 330 inches (838 centimeters).

7. The fuselage for an aircraft of claim 1, further comprising a third of said stretched-quadrant fuselage segment interposed between said flight deck segment and said first stretched-quadrant fuselage segment.

8. The fuselage for an aircraft of claim 7, wherein a length of said third stretched-quadrant fuselage segment is in a range from 0 inches to 250 inches (635 centimeters).

9. A stretched-quadrant fuselage segment for an aircraft, comprising:
   a fuselage wall extending longitudinally from a first end to a second end of said stretched-quadrant fuselage segment, said fuselage wall enclosing a void space configurable as a cabin having a cabin floor, said cabin configured to accept a seating row including up to three passenger seats attached to said cabin floor and further configured to accept above said cabin floor an LD-3 unit load device having an overall height dimension of 64 inches (163 centimeters), a longest dimension of 79 inches (201 centimeters), and a third dimension across opposing sides of 60.4 inches (153 centimeters), said LD-3 unit load device positionable with an angled panel on said LD-3 unit load device extending in a transverse direction across said stretched-quadrant fuselage segment;
   said fuselage wall having an interior surface formed with an interior transverse width in a range from 92 inches (234 centimeters) to 104 inches (264 centimeters) and an interior height in a range from 92 inches to 104 inches, said interior surface having a longitudinal centerline positioned halfway along said interior transverse width and halfway along said interior height;
   said fuselage wall formed with a first of a stretched-quadrant protrusion, said stretched-quadrant protrusion formed by a displacement of said interior surface away from an inscribed circle centered on said longitudinal centerline, said inscribed circle tangent to said interior surface at opposite ends of a transverse horizontal axis passing through said longitudinal centerline;

said displacement having a maximum separation distance from said inscribed circle to said interior surface in a range from one inch (2.5 centimeters) to four inches (10.2 centimeters);

said first stretched-quadrant protrusion formed above said transverse horizontal axis with said maximum separation distance located along said interior surface at an angle of 45 degrees from said transverse horizontal axis; and a second of said stretched-quadrant protrusion formed above said transverse horizontal axis with said maximum separation distance located along said interior surface at an angle of 135 degrees from said transverse horizontal axis.

10. The stretched-quadrant fuselage segment of claim 9, further comprising:

a third stretched-quadrant protrusion formed below said horizontal axis with said maximum separation distance located along said interior surface at an angle of 225 degrees from said horizontal axis; and a fourth stretched-quadrant protrusion formed below said horizontal axis with said maximum separation distance located along said interior surface at an angle of 315 degrees from said horizontal axis.

11. The fuselage for an aircraft of claim 1, further comprising:

a third stretched-quadrant protrusion formed below said horizontal axis with said maximum separation distance located along said interior surface at an angle of 225 degrees from said horizontal axis; and a fourth stretched-quadrant protrusion formed below said horizontal axis with said maximum separation distance located along said interior surface at an angle of 315 degrees from said horizontal axis.

* * * * *